United States Patent [19]

Kourbetsos

[11] 4,099,602
[45] Jul. 11, 1978

[54] HYDRAULIC POSITIONER WITH BIDIRECTIONAL DETENTING ACTION

[75] Inventor: John Kourbetsos, Woodland Hills, Calif.

[73] Assignee: P. L. Porter Company, Woodland Hills, Calif.

[21] Appl. No.: 829,473

[22] Filed: Aug. 31, 1977

[51] Int. Cl.$^2$ ............................................. F16F 9/20
[52] U.S. Cl. .................................. 188/300; 188/312; 188/314; 188/316; 248/354 H; 267/64 R
[58] Field of Search ............................ 267/64 R, 65 R; 188/300, 312, 313, 314, 316, 317, 319, 282; 16/51, 52, 58; 248/354 H

[56] References Cited

U.S. PATENT DOCUMENTS

| | | | |
|---|---|---|---|
| 2,716,470 | 8/1955 | Focht | 188/312 |
| 2,782,877 | 2/1957 | Crabtree | 188/317 |
| 2,867,298 | 1/1959 | Roder | 188/314 |
| 3,228,632 | 1/1966 | Hunth | 188/312 |
| 3,236,515 | 2/1966 | Ackerman | 188/300 |

FOREIGN PATENT DOCUMENTS

| | | | |
|---|---|---|---|
| 587,934 | 12/1959 | Canada | 188/319 |
| 948,067 | 7/1949 | France | 188/317 |

*Primary Examiner*—Trygve M. Blix
*Assistant Examiner*—Edward R. Kazenske
*Attorney, Agent, or Firm*—George F. Smyth

[57] ABSTRACT

A hydraulic positioner for maintaining a given separation between its attachment points and having a bidirectional detenting action whereby the given separation can be altered only by application of a sufficiently large overriding force. A closed cylinder is divided into two closed fluid-filled chambers by a slidable piston. Motion of the piston requires transfer of fluid between the chambers. The transfer flow is determined by preloaded check valves in the transfer flow path. The check valves are preloaded in opposite directions to achieve the bidirectional detenting action. A reservoir supplies fluid under a small positive pressure to one of the closed fluid-filled chambers to replace fluid lost through leakage.

6 Claims, 2 Drawing Figures

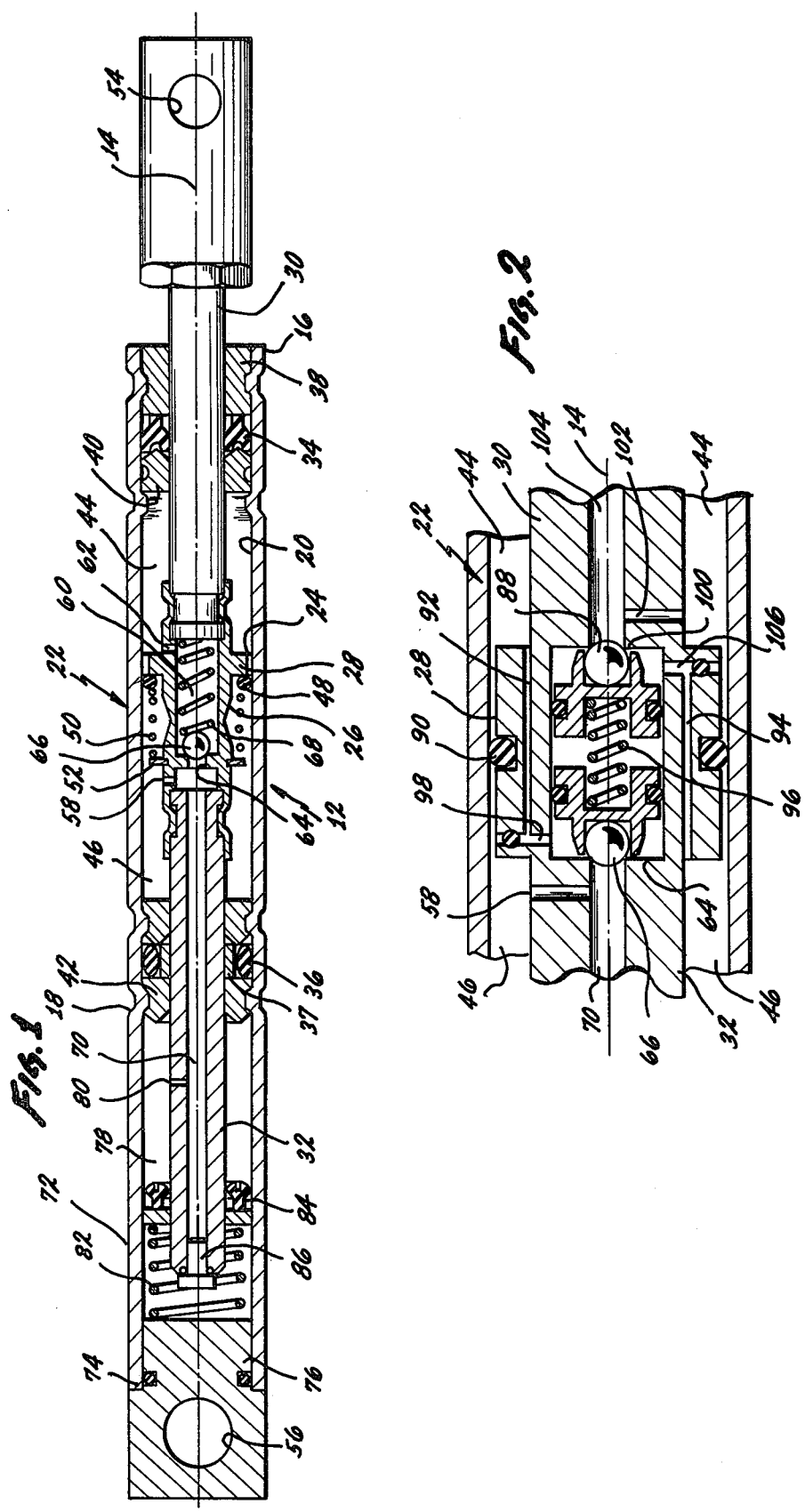

HYDRAULIC POSITIONER WITH BIDIRECTIONAL DETENTING ACTION

BACKGROUND OF THE INVENTION

1. Field of the Invention

The present invention is in the field of hydraulics and more specifically relates to an hydraulic positioner for maintaining a given separation between its attachment points which has a bidirectional detenting action whereby the given separation can be altered only by application of a sufficiently large overriding force.

2. The Prior Art

Unlike shock absorbers, which are operative only when in motion, the present invention remains stationary between successive alterations. The present invention includes two attachment points whose separation is selectively alterable by application of a force in excess of a predetermined magnitude. As long as the predetermined magnitude of force is not exceeded, the device of the present invention provides a rigid connection between its two attachment points. From a first given separation, the attachment points can be selectively spread more widely apart or can be drawn more closely together, but not alteration can be made unless the applied force exceeds the predetermined magnitude. Thus, the present invention exhibits a bidirectional detenting action from any given separation.

In contrast to the present invention, the invention disclosed by Ackerman in U.S. Pat. No. 3,236,515 exhibits a locking action rather than a detenting action. When Ackerman's device is locked, no amount of force will alter the separation between the attachement points. When Ackerman's device is unlocked, it will not maintain a given separation between the attachment points if a measurable force is applied to the attachment points.

In U.S. Pat. No. 3,228,632, issued Jan. 11, 1966 to Hunth, a different form of lock is described. That device includes a piston movable within a cylinder by piston rods extending in opposite directions from the piston. One side of the piston is called the inlet side and the other side of it is called the outlet side. The device is set to transmit movements of varying amplitude and direction from the inlet piston rod to the outlet rod while preventing reaction forces applied to the outlet rod from being transmitted to the inlet rod. In contrast with the present invention, the Hunth device lacks a reservoir and employs a different system of valving.

In U.S. Pat. No. 2,782,877 issued Feb. 26, 1957 to Crabtree, there is shown a shock absorber in which the rate of movement is controlled by opposed flapper valves. The flappers are resiliently deformable, and the construction of the flapper valve is such that the application of any measurable force will result in some fluid flow. Consequently, the Crabtree device is incapable of maintaining a fixed separation between its attachment points when forces less than a predetermined magnitude are applied. Crabtree shows a reservoir which is pressurized by the compression of air which partially fills the reservoir. Transfer of fluid from the reservoir to one of the working chambers is controlled by a preloaded ball check valve.

In U.S. Pat. No. 2,487,472 issued Nov. 8, 1949 to Patriquin, and in Canadian Pat. No. 587,934, issued Dec. 1, 1951 to Whisler, Jr. there is shown a check valve in which an O-ring forms a seal between a surface of a piston and the cylinder wall. Both of these devices differ markedly in structure and operation from the present invention. Neither of these inventions will maintain a fixed separation between its attachment points when any measurable force is applied in one of the two directions.

In a copending application, Ser. No. 761,908 filed Jan. 24, 1977, the present inventor, John Kourbetsos, has disclosed a hydraulic snubber in which a check valve employing an O-ring is used for limiting the rate of motion in one direction while alternately permitting unlimited rate of motion in the opposite direction. Clearly, that device cannot be used to maintain a fixed separation between its attachment points.

Thus, it appears that none of the prior art inventions described above operate in the same manner as the present invention, and in addition, the present invention can be distinguished on the basis of its structure.

The prior art does not disclose a hydraulic positioner for maintaining a given separation between its attachment points and exhibiting a bidirectional detenting action whereby it rigidly maintains the given separation until the separation is altered by application in either direction of an overriding force greater than some predetermined magnitude. The present invention further includes a pressurized reservoir for replacing any fluid lost by leakage. Thus, it appears that the present invention fills a long-standing deed for a device of its kind, and should prove valuable in such diverse applications as supporting the hoods of automobiles and trucks, positioning lamps and illuminators, and providing steady support for positioning apparatus used by a dentist.

SUMMARY OF THE INVENTION

In the present invention, a closed cylinder is divided into two closed fluid-filled chambers by a slidable piston. Motion of the piston within the cylinder requires a transfer of fluid between the chambers. This flow of fluid is determined by preloaded check valves, associated with the piston and moving with it. The check valves are preloaded in opposite directions to achieve a bidirectional detenting action. When a force, applied to the piston is less than that required to overcome the preloading of the appropriate check valve, the separation between the points of attachment remains fixed and the device provides a rigid connection between its attachment points. However, when the applied force is sufficiently great to overcome the preload on the applicable check valve, the valve opens, permitting transfer of fluid from one another to the other and resulting in movement of the piston within the cylinder, which in turn alters the separation between the points of attachment.

Piston rods are attached to the piston and extend from it in opposite directions. Each of the piston rods passes through a seal at an end of the cylinder and extends beyond the cylinder. One of the rods extends into a reservoir of pressurized fluid. Pressurization, in a preferred embodiment is achieved by a compression spring which bears on a pressurizing piston. The rod which extends into the reservoir is provided with an internal passage ported to the outside surface of the rod at locations spaced axially along the rod so that when one of the ports opens into the reservoir, the port at the other end of the passage opens into one of the fluid-filled chambers adjacent the slidable piston. In that position, pressurized fluid can communicate between the reservoir and the chamber so as to maintain a modest overpressure in the chamber and to permit a flow of fluid from the reservoir into the chamber to replace fluid lost by leakage.

Two check valves are associated with the piston for movement with it. In a preferred embodiment of the invention, one of the check valves is a preloaded ball check valve disposed to control the flow of fluid through a passage extending through the piston. In that embodiment, the other check valve associated with the piston includes a spring-loaded O-ring oriented in a plane perpendicular to the axis of the cylinder and of suitable diameter to slidably sealingly engage the inner surface of the cylinder. The O-ring is preloaded against a peripheral portion of the piston to form a defeatable seal with it to normally prevent the flow of fluid between the piston and the wall of the cylinder, between which there is a small space.

In an alternative embodiment, the piston is provided with an O-ring seal around its periphery which maintains an undefeatable slidable sealing engagement between the piston and the cylinder wall. In this alternative embodiment, two preloaded ball check valves are associated with the piston and move with it. These ball check valves are preloaded in opposite directions and each control the flow of fluid through a passage through the piston. It is seen that the O-ring check valve used in the preferred embodiment serves a dual purpose in that it acts as a check valve and in addition it provides a seal between the piston and the cylinder wall, thereby eliminating the need for the O-ring used in the alternative embodiment to seal between the piston and the cylinder wall. In both of the embodiments described above, a small space is left intentionally between the metallic portion of the piston and the inner wall of the cylinder, and in both embodiments this space is sealed by an O-ring seal.

In a preferred embodiment, the hydraulic positioner of the present invention is attached to the object whose separation it is desired to maintain at two points. One of the attachment points is at one end of the solid piston rod which extends beyond the end of the cylinder. The other attachment point is connected to the cylinder, and in a preferred embodiment is located axially at the end of the positioner opposite the first attachment point.

In all embodiments of the present invention, the two piston rods which extend in opposite directions from the piston move in unison with the piston. Alterations in the separation are accommodated by motion of the piston with respect to the cylinder which surrounds it.

The novel features which are believed to characterize the invention, both as to its structure and operation will be better understood from the following detailed description considered in connection with the accompanying drawings in which a preferred embodiment and an alternative embodiment of the invention are illustrated by way of example. It is to be understood, however, that the drawings are for the purpose of illustration and description only, and are not intended as a definition of the limits of the invention.

BRIEF DESCRIPTION OF THE DRAWINGS

FIG. 1 is a cross sectional view along the central axis of the preferred embodiment of the hydraulic positioner of the present invention; and, FIG. 2 is a fractional cross sectional view along the central axis of the piston portion of an alternative embodiment of the present invention.

DESCRIPTION OF THE PREFERRED EMBODIMENT

Turning now to the drawings in which like parts are denoted by the same reference numerals, the preferred embodiment and best known mode for practicing the invention is shown in FIG. 1 in cross sectional view. The body of the hydraulic positioner has the form of a hollow cylinder 12 extending along an axis 14 from a first end 16 to a second end 18, and having an inwardly-facing bore surface 20.

A piston assembly 22 is slidable axially within the cylinder and has a first side 24 facing to the right in FIG. 1 and a second side 26 facing to the left in FIG. 1. The piston has a peripheral portion 28 which includes generally the portions of the piston extending both radially and axially which lie farthest from the axis 14. It should be noted, however, that the peripheral portion 28 of the piston does not extend so far outward radially as to contact the bore surface 20; instead, an annular space is left between them.

A first rod 30 attached to the first side 24 of the piston assembly 22 extends axially in a first direction, to the right in FIG. 1 beyond the first end 16 of the hollow cylinder 12. A second rod 32, attached to the second side 26 of the piston assembly 22 extends in a second direction, to the left in FIG. 1 beyond the second end 18 of the hollow cylinder 12.

The hollow cylinder 12 is sealed at its first end 16 by the U-cup seal 34 and at its second end 18 by the resilient O-ring 36 and the metallic glide ring 37, the latter preventing damage to the O-ring 36 as the port 80 slides past the O-ring. The sealing members 34, 36, 37 remain stationary with respect to the hollow cylinder 12. as the piston assembly 22 and the piston rods 30, 32 attached to it move as a unitary structure through the hollow cylinder 12. Additional sealing is provided by a gland 38 at the first end 16 of the cylinder 12. The rods 30, 32 fit slidably through the bearings 40, 42, also located near the ends of the cylinder and which maintain the alignment of the rods 30, 32 with the axis 14 of the cylinder 12. The piston assembly 22 divide the volume of the hollow cylinder 12 into two sealed chambers 44, 46 which are separated by the piston assembly 22. The first rod 30 and the second rod 32 have the same diameter in the preferred embodiment, and therefore the volume within the hollow cylinder 12 occupied by the piston assembly 22 and portions of the rods 30, 32 remains constant as the piston assembly is moved axially within the cylinder 12. This contrasts sharply with the situation which prevails in many shock absorbers in which the piston assembly is attached to the end of only one piston rod. In such cases, the volume displaced by the piston rod and piston assembly varies as the piston moves due to intromission and withdrawal of the piston rod so that it becomes necessary to provide for the transfer of some of the fluid to and from a reservoir. The provision of the second piston rod 32 in the preferred embodiment eliminates the need for a reservoir, although, as will be seen below, it is desirable to provide a reservoir for other reasons.

In the preferred embodiment, all of the volume within the first sealed chamber 44 and second sealed chamber 46 not occupied by the piston assembly 22 and portions of the rods 30, 32 is filled with a fluid. In the preferred embodiment, the fluid is a liquid hydraulic fluid, and the word fluid is used in its general sense to include liquids, gases, and vapors in other embodiments.

In the preferred embodiment in FIG. 1, an O-ring 48 is associated with the piston assembly 22 to form a first check valve. The O-ring 48 always remains oriented in a plane perpendicular to the axis 14 and is captively confined to the piston assembly 22 by the compression spring 50 which bears against the crescent ring 52 continually urging the O-ring 48 to the right in FIG. 1. The O-ring 48 always remains in slidable sealing engagement with the bore surface 20, and when the piston assembly 22 is stationary, the O-ring 48 sealingly engages a radially extending surface on the peripheral portion 28 of the piston assembly 22 to form a seal between the piston assembly and the bore surface 20. A force applied to the piston assembly 22 in the second direction, left in FIG. 1, tends to cause the O-ring 48 to seal more tightly against the peripheral portion 28 of the piston assembly 22, thereby preventing fluid from flowing from the second sealed chamber 46 around the peripheral portion 28 of the piston into the first sealed chamber 44.

On the other hand, a force applied to the piston assembly 22 in the first direction, to the right in FIG. 1, instantaneously causes a pressure differential between the portions of the O-ring 48 in contact respectively with the fluid in the chambers 44, 46 and this differential pressure, aided by the sliding friction between the O-ring 48 and the bore surface 20, urges the O-ring away from the peripheral portion 28 of the piston. When the separating forces exceed the force applied by the compression spring 50, the O-ring separates from the peripheral portion 28 of the piston, defeating its sealing engagement therewith, and permitting fluid to flow from the first sealed chamber 44 axially around the peripheral portion 28 of the piston through the annular space between it and the bore surface 20 and into the second sealed chamber 46.

It is noteworthy that the O-ring 48 serves both as a seal between the piston assembly 22 and the bore surface 20 and also serves as a check valve to control the flow of fluid from the first sealed chamber 44 to the second sealed chamber 46.

From FIG. 1 it can be seen that withdrawal of the rod 30 from the cylinder is possible only when sufficient force is applied to the rod 30 in the first direction (to the right in FIG. 1) to overcome the preloading force of the compression spring 50 against the O-ring 48. In this manner, the separation between the attachment points 54, 56 can be increased.

Motor of the piston assembly 22 in the second direction (to the left in FIG. 1) is controlled by a ball check valve which controls the flow of fluid from the second sealed chamber 46 through a port 58 through a passage 60 and through a port 62 to the first sealed chamber 44. The ball check valve includes a circular valve seat 64 against which a ball 66 is continually urged by a compression spring 68. When a force is applied to the piston assembly 22 in the second directior (to the left in FIG. 1) a differential pressure is created across the ball 66 which tends to urge it away from the valve seat 64. When the applied force is sufficiently great, the urging of the compression spring 68 is overcome and the seal between the ball 66 and the valve seat 64 is defeated permitting fluid to flow from the second sealed chamber 46 to the first sealed chamber 44 thereby permitting the piston assembly 22 to advance in the second direction relative to the cylinder 12. In this manner, the separation between the attachment points 54, 56 is decreased, but only when a sufficiently large force is applied. If a lesser force is applied, the hydraulic positioner remains rigid, maintaining the separation between the attachment points 54, 56.

In the preferred embodiment, a fluid reservoir is provided in the form of a cylindrical extension 72 of the hollow cylinder 12, connected to the hollow cylinder 12 at its second end 18 and extending in the second direction. The cylindrical extension 72 is closed at its left-most end 74 by an end plug 76, to form a reservoir chamber 78 closed at its other end by the O-ring 36 and glide ring 37.

In the preferred embodiment, the second rod 32 extends in the second direction into the reservoir chamber 78. The second rod 32 is provided with an axially-extending passage within it, which communicates with the reservoir chamber 78 through a port 80 and with the second sealed chamber 46 through the port 58. The reservoir chamber 78 is filled with fluid and the fluid is maintained under a small positive pressure by the force of the compression spring 82 applied to the U-cup seal 84. The pressure thus produced on the fluid in the reservoir chamber 78 is chosen to be considerably less than that required to open the ball check valve 66. In the preferred embodiment, the passage 70 is terminated by the fill screw 86.

Although the positioner of the present invention would function adequately without the reservoir, certain advantages can be obtained through its use. The reservoir maintains a small positive overpressure in the chamber 46. This overpressure is transmitted to the sealed chamber 44 when the chambers are in communication and also the pressure is transmitted by the piston assembly 22 when the check valves are closed. The small positive overpressure in the sealed chambers 44, 46 prevents ambient fluids from entering those chambers. The overpressure also serves to drive fluid from the reservoir chamber 78 into the sealed chambers 46, 44 to replace the fluid lost from those chambers by leakage.

Turning now to the alternative embodiment of the piston assembly shown in FIG. 2, it can be seen that a symmetrical arrangement of ball check valves 66, 88 is used to control the flow of fluid through the piston assembly 22. An O-ring seal 90 is seated on the surface of the peripheral portion 28 of the piston assembly 22, and is always in sealing engagement with both the piston assembly 22 and the bore surface 20 to prevent the passage of fluid through the space therebetween.

In the alternative embodiment of FIG. 2, two separate passages 92, 94 are provided to permit the flow of fluid through the piston assembly between the sealed chambers 44, 46.

When a force is applied to the piston assembly 22 in the second direction (to the left in FIG. 2) a pressure differential is created across the ball 66 tending to urge it away from its seat 64. If the applied force is of sufficient magnitude, the ball 66 is forced away from its seat, overcoming the urging of the compression spring 96 and permitting the fluid to flow from the second sealed chamber 46, through the port 58, through the passage 70, past the ball valve 66 through the passage 98, through the passage 92 and into the first sealed chamber 44, permitting the piston assembly 22 to move in the second direction relative to the cylinder 12.

Likewise, when a sufficiently strong force is applied to the piston assembly 22 in the first direction (to the right in FIG. 2) the ball 88 is moved away from its seat 100 thereby permitting fluid to flow from the first sealed chamber 44 through the port 102 into the passage 104, past the valve 88, through the passage 106 into the passage 94 to the second sealed chamber 46, thereby permitting the piston assembly 22 to move in the first direction relative to the cylinder 12.

Thus, the alternative embodiment shown in FIG. 2 provides the same type of bidirectional detenting action as the preferred embodiment of FIG. 1, in that the device rigidy maintains a fixed separation between the attachment points 54, 56 until a sufficiently strong overriding force is applied in either direction to overcome the preloading of the respective check valves. The alternative embodiment shown in FIG. 2 is provided with a reservoir similar to that shown in connection with the preferred embodiment of FIG. 1.

Thus, there has been described a hydraulic positioner which can be adjusted to a given separation between its attachment points and which thereafter maintains indefinitely the given separation, and which has a bidirectional detenting action whereby the given separation can be increased or decreased only by application of a sufficiently overriding force in the desired direction.

The hydraulic positioner is provided with a pressurized reservoir of fluid which prevents air or ambient fluids from entering the sealed chambers, which would tend to render the positioner less rigid when used to maintain a given separation between two objects. The reservoir supplies fluid to the sealed chambers to replace any fluid that may be lost by leakage.

Althrough the present invention has been described in relation to an exemplary preferred embodiment and an alternative embodiment, it is recognized that numerous design variations are conceivable within the spirit of the present invention. Such design variations are therefore included within the present invention which is limited only by the scope of the appended claims.

What is claimed is:

1. An hydraulic positioner of the type in which a piston is movable within a fluid-filled cylinder, for adjustment to a given separation between its attachment points and for thereafter maintaining the given separation, having a bidirectional detenting action whereby the given separation can be altered only by application of a sufficiently large overriding force, said hydraulic positioner comprising:

a cylinder, hollow and having a central axis, open at its first and second ends, and having an inwardly-facing bore surface;

piston means, slidable axially within said cylinder, having a first side facing in a first axial direction and having a second side facing in a second axial direction opposite the first axial direction, and having a peripheral portion adjacent the bore surface of said cylinder but spaced from it;

a first rod attached to the first side of said piston means and extending in said first axial direction;

a second rod attached to the second side of said piston means and extending in said second axial direction;

first stationary sealing means positioned in said cylinder near its first end, in slidable sealing engagement with said first rod and forming a first sealed chamber for containing fluid within said cylindrical between said first stationary sealing means and said piston means;

second stationary sealing means positioned within said cylinder near its second end, in slidable sealing engagement with said second rod and forming a second sealed chamber for containing fluid within said cylinder between said second stationary sealing means and said piston means;

first check valve means associated with said piston means for movement therewith, preventing fluid from passing through it from said second sealed chamber to said first sealed chamber, and passing fluid from said first sealed chamber to said second sealed chamber when a force in excess of a predetermined force is applied to said piston means in said first direction;

second check valve means associated with said piston means for movement therewith, preventing fluid from passing through it from said first sealed chamber to said second sealed chamber, and passing fluid from said second sealed chamber to said first sealed chamber when a force in excess of a predetermined force is applied to said piston means in said second direction;

a reservoir for fluid, including a closed chamber extending in the second direction beyond the second end of said cylinder; and, means for pressurizing fluid in said reservoir;

said second rod extending through said second stationary sealing means and beyond the end of said cylinder into said reservoir, said second rod further comprising an internal passage extending through it between two ports spaced sufficiently far apart in the axial direction to permit communication of pressurized fluid through said second rod from said reservoir to said second sealed chamber so that said second sealed chamber is pressurized at a small positive pressure and so that pressurized fluid is supplied from said reservoir to said second sealed chamber to replace leakage.

2. The hydraulic positioner of claim 1 wherein said first check valve further comprises a resilisnt ring-shaped member associated with said piston means for movement therewith in slidable sealing engagement with the bore surface of said cylinder, disposed in a plane perpendicular to the central axis and preloaded against the peripheral portion of said piston on the side of it facing in said second direction to normally sealingly engage it preventing fluid from passing between the peripheral portion of said piston means and said bore surface of said cylinder, and losing sealing engagement with said peripheral portion of said piston means when a force in excess of a predetermined force is applied to said piston means in said first direction so that fluid then flows from said first sealed chamber to said second sealed chamber between the peripheral portion of said piston and the bore surface of said cylinder.

3. The hydraulic positioner of claim 2 wherein said second check valve means is a ball check valve associated with said piston means and preloaded to normally seal against a portion of said piston means preventing fluid from passing from said first sealed chamber to said second sealed chamber and passing fluid from said second sealed chamber to said first sealed chamber when a force in excess of a predetermined force is applied to said piston means in said second direction.

4. The hydraulic positioner of claim 1 further comprising peripheral sealing means associated with said piston means for movement therewith and disposed about the peripheral portion thereof forming a slidable seal between the peripheral portion of said piston means and said bore surface of said cylinder preventing the passage of fluid therebetween.

5. The hydraulic positioner of claim 4 wherein said first and said second check valves are preloaded ball check valves.

6. The hydraulic positioner of claim 1 wherein said reservoir is a cylindrical-shaped extension of said cylinder extending from its second end, and coaxial with said cylinder.

* * * * *